US009517713B2

United States Patent
Honigsberg

(10) Patent No.: US 9,517,713 B2
(45) Date of Patent: Dec. 13, 2016

(54) ROTATABLE CARGO PLATFORM FOR TRAILER VEHICLE

(71) Applicant: Matthew Honigsberg, Dickinson, ND (US)

(72) Inventor: Matthew Honigsberg, Dickinson, ND (US)

( * ) Notice: Subject to any disclaimer, the term of this patent is extended or adjusted under 35 U.S.C. 154(b) by 172 days.

(21) Appl. No.: 13/975,456

(22) Filed: Aug. 26, 2013

(65) Prior Publication Data
US 2015/0056049 A1 Feb. 26, 2015

(51) Int. Cl.
*B60P 3/06* (2006.01)
*B60P 3/07* (2006.01)

(52) U.S. Cl.
CPC ... *B60P 3/06* (2013.01); *B60P 3/07* (2013.01)

(58) Field of Classification Search
CPC ............... B60P 1/43; B60P 3/06; B60P 3/07; B61D 3/04; B61D 47/00; B61D 47/005
USPC .......................................................... 414/539
See application file for complete search history.

(56) References Cited

U.S. PATENT DOCUMENTS

| | | | | |
|---|---|---|---|---|
| 2,697,644 A * | 12/1954 | Zeilman | ....................... | 384/520 |
| 3,255,899 A * | 6/1966 | Mengel | .................. | B65G 67/24 |
| | | | | 104/44 |
| 3,536,214 A * | 10/1970 | Sorg et al. | ..................... | 414/537 |
| 3,884,158 A * | 5/1975 | Rumell | ............................. | 410/1 |
| 4,483,652 A * | 11/1984 | Barry | .................. | B65G 63/022 |
| | | | | 104/29 |
| 4,704,062 A | 11/1987 | Hale | | |
| 4,724,875 A * | 2/1988 | Baldwin et al. | ................. | 141/98 |
| 4,796,537 A * | 1/1989 | Besser | ............................ | 104/37 |
| 4,973,206 A | 11/1990 | Engle | | |
| 5,051,046 A | 9/1991 | Oren | | |
| 5,086,704 A * | 2/1992 | Mueller | .................... | E04H 6/40 |
| | | | | 104/36 |
| 5,440,970 A * | 8/1995 | Tonsor | .................... | F15B 15/12 |
| | | | | 414/684 |
| 6,102,370 A * | 8/2000 | Johnston | ................... | B60P 3/14 |
| | | | | 254/420 |
| 6,123,499 A * | 9/2000 | Thornton | ................ | B60P 3/122 |
| | | | | 414/477 |
| 6,948,702 B1 | 9/2005 | Nigro | | |
| 7,360,983 B2 * | 4/2008 | Pate | .............................. | 414/495 |
| 7,427,183 B2 * | 9/2008 | Stabeno | ........................ | 414/482 |
| 8,066,467 B2 * | 11/2011 | Hammonds | .......... | B62D 53/045 |
| | | | | 244/50 |
| 8,403,353 B2 * | 3/2013 | Fink | ...................... | B60P 3/1033 |
| | | | | 280/414.1 |

* cited by examiner

Primary Examiner — Michael McCullough
Assistant Examiner — Ashley Romano
(74) *Attorney, Agent, or Firm* — Global Intellectual Property Agency, LLC; Daniel Boudwin

(57) ABSTRACT

A modular trailer vehicle is provided comprises a wheeled trailer chassis having a forward vehicle attachment, along with a rotatable cargo platform attached to the chassis for supporting cargo hauled thereon. The rotatable cargo platform is rotatably mounted to a hydraulically actuated turntable, which facilitates rotation of the platform from a position in alignment with the chassis to a position wherein the loading ramp is positioned off to the side of the trailer. The platform is capable of complete rotation about a central axis defined by the turntable center, wherein at least two hydraulic arms actuate the turntable, which supports the rotatably platform using a bearing assembly attached to the trailer chassis.

7 Claims, 3 Drawing Sheets

ROTATABLE CARGO PLATFORM FOR TRAILER VEHICLE

BACKGROUND OF THE INVENTION

Field of the Invention

The present invention relates to vehicle trailers and means of loading and unloading flatbed vehicle trailers. More specifically, the present invention pertains to a new vehicle trailer having a rotatable cargo platform that allows for loading and unloading from the rear or from either side of the trailer, offering cargo operators and trailer haulers the flexibility to load and unload at different angles with respect to the trailer orientation.

Flat-bed trailers are well known vehicles in the art that offer expanded cargo capacity when hauling equipment, other vehicles, or construction equipment between locations. These types of trailers range in size and complexity, depending on the anticipated use and the carrying loads anticipated by the operator. Of particular interest in the present invention are vehicle trailers and large equipment trailers, which generally include a trailer of long wheel base and a chassis suited for carrying significant loads (i.e. construction equipment, industrial materials, commercial vehicles, partially assembled items, etc.).

Loading and unloading these long-wheelbase trailers is generally accomplished by a platform or ramp that is lowered from the rear of the trailer, or alternatively the equipment is lifted via a crane from the side of the vehicle directly therefrom. When unloading wheeled cargo items, such as industrial construction equipment and the like, flexibility with regard to loading onto and unloading from the trailer is desired. Given the size of the trailer, positioning the trailer using the lead vehicle in a construction area or in an area with little open space can be difficult on the operator, and make loading or unloading of the trailer more difficult.

The present invention discloses a new and novel trailer having a rotatable platform, whereby the rotatable platform is supported above the trailer chassis or frame and cargo is loaded directly onto the rotatable platform. The bow of the trailer includes a towing vehicle attachment, while the chassis is supported by at least one wheel axle along its length. To facilitate loading, the platform is rotatable such that the loading ramp can be deployed along the sides of the trailer. A hydraulically controlled turntable is provided between the trailer chassis and the rotatable platform to facilitate rotation thereof, whereby heavy equipment can stay secured to the platform and thereafter unloaded and reloaded from the side of the trailer. Overall, the assembly is designed to improve efficiency and reduce maneuvering burdens on vehicle operators and cargo workers (e.g. loading dock operators, construction equipment operators, etc.).

Description of the Prior Art

Devices have been disclosed in the prior art that relate to vehicle trailers. These include devices that have been patented and published in patent application publications. The following is a list of devices deemed most relevant to the present disclosure, which are herein described for the purposes of highlighting and differentiating the unique aspects of the present invention, and further highlighting the drawbacks existing in the prior art.

One such example in the prior art is U.S. Pat. No. 4,704,062 to Hale, which discloses a trailer of the roll-on, roll-off type that includes a self-contained power plant that enables articulation of the trailer bed without the presence of the towing vehicle. The device includes a trailer structure comprising a chassis, wheels, towing end, and other common features of a trailer. Along with these features, the Hale device further includes a motorized winch, a fuel tank, and a hoisting frame that can be tilted at an angle to allow for roll-on, roll-off loading capability. The Hale device, while providing a trailer having an articulating bed, provides a structure that is suited for loading from the rear of the device, rather than offering the operator the capability of loading from the rear or the sides of the trailer. The present invention contemplates a rotatable trailer bed that improves the flexibility with which a trailer can be loaded and offloaded.

Another such example is U.S. Pat. No. 6,948,702 to Nigro, which discloses a hydraulic lift for a trailer, wherein hydraulic cylinders are utilized to support a trailer and act as an adjustable jackstand therefor. A hydraulic pump controls the operation of the device, wherein the hydraulic cylinders can be moved vertically to orient one end of the trailer for loading, unloading, and for extended support. While disclosing a hydraulic device related to trailers, the Nigro device fails to contemplate a movable cargo area that supports modular loading and unloading methods.

The devices in the prior art disclose modular trailer systems and those having adjustable elements. However, none are provided with a rotatable trailer platform that facilitates loading and unloading from the sides of the vehicle trailer. The present invention is particularly suited for hauling heavy loads that can be driven onto and off of the trailer, wherein side loading is facilitated. This includes construction equipment, cargo that can be hauled away using wheeled vehicles, and the like. The assembly hydraulically actuates a turntable to rotate the trailer platform, whereby the platform rotates from a position in alignment with the trailer chassis to one that is off-angle for side loading.

It is submitted that the present invention is substantially divergent in design elements from the prior art, and consequently it is clear that there is a need in the art for an improvement to existing trailer vehicle systems. In this regard the instant invention substantially fulfills these needs.

SUMMARY OF THE INVENTION

In view of the foregoing disadvantages inherent in the known types of trailer systems and trailer loading means now present in the prior art, the present invention provides a new trailer vehicle that can be utilized by cargo operators when loading or unloading a trailer with cargo from any angle with respect to the vehicle chassis.

It is therefore an object of the present invention to provide a new and improved trailer vehicle that has all of the advantages of the prior art and none of the disadvantages.

It is another object of the present invention to provide a trailer vehicle having a trailer chassis supporting a rotatable cargo platform thereabove, wherein the platform is adapted to support the cargo thereon and be rotatable with respect to the chassis for loading and unloading purposes.

Another object of the present invention is to provide a trailer vehicle that includes a hydraulically controlled turntable controllable by the vehicle operator or a cargo loader operator adjacent to the trailer.

Yet another object of the present invention is to provide a trailer vehicle that facilitates side loading or traditional rear loading of the trailer vehicle, wherein the cargo platform is capable of full and continuous rotation by way of the hydraulically controlled turntable.

Another object of the present invention is to provide a trailer vehicle that is particularly suited for loading wheeled cargo such as construction equipment, vehicles, and pallets of material.

A final object of the present invention is to provide a trailer vehicle that comprises a robust design that can be utilized in harsh environments and for prolonged periods without maintenance, such as required by trailer vehicles, cargo haulers, and military vehicles.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
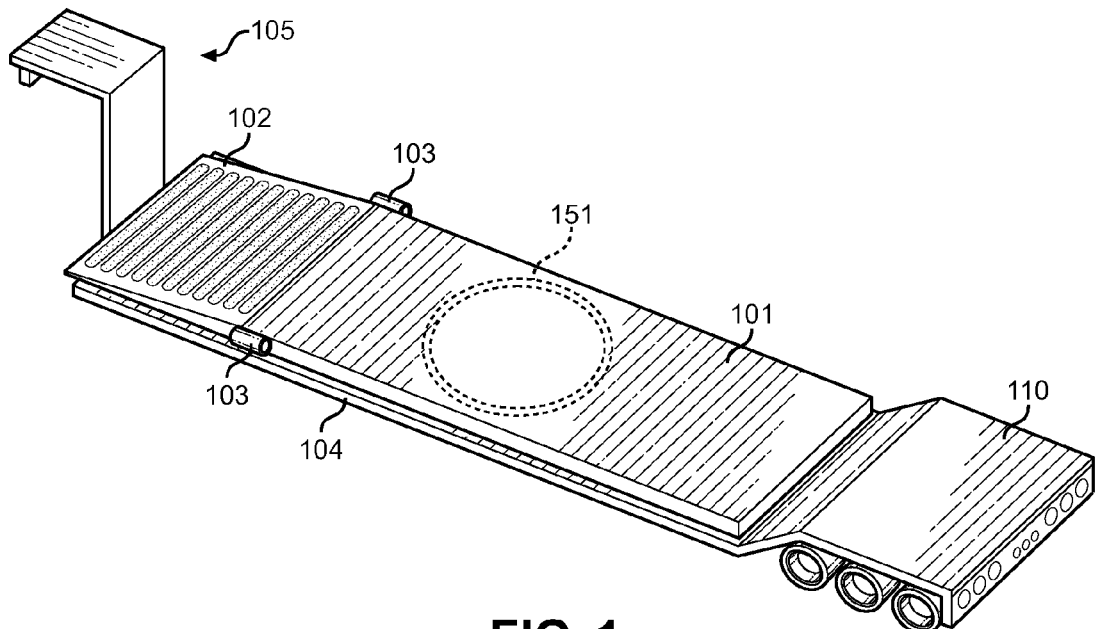
FIG. 1 shows an overhead perspective view of an illustrative embodiment of the present invention.

Reference is made herein to the attached drawings. Like reference numerals are used throughout the drawings to depict like or similar elements of the trailer vehicle. For the purposes of presenting a brief and clear description of the present invention, the preferred embodiment will be discussed as used for providing a modularly loadable and unloadable trailer vehicle having a rotatable cargo area. The figures are intended for representative purposes only and should not be considered to be limiting in any respect.

Figure 2:
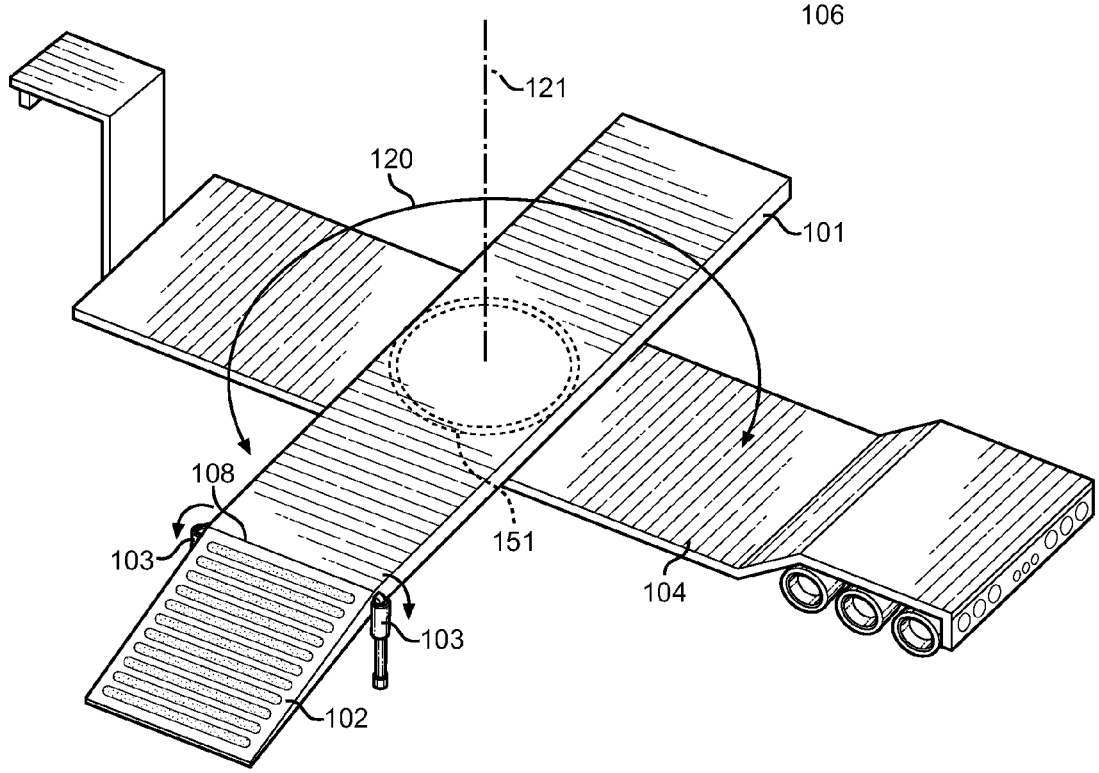
FIG. 2 shows an overhead perspective view of the cargo platform being rotated with respect to the trailer chassis.

Referring now to FIGS. 1 and 2, overhead perspective views of the trailer vehicle of the present invention are provided. The trailer vehicle comprises a trailer chassis 104 having a leading end 105 and a trailing end 110. The chassis 104 comprises a trailer frame adapted to support cargo loads and vehicle loads, while also supporting from a lead vehicle connection and the trailer suspension and tires. The lead vehicle connection means preferably comprises a gooseneck trailer connection, while at least one wheel axle 106 is provided along the chassis 104 length. The carrying capacity and size of the trailer will dictate the type of lead vehicle connection and the number of axles the trailer supports.

Mounted over the trailer chassis is a rotatable platform 101 that is adapted to support the cargo of the trailer thereon. The platform 101 is mounted to a turntable 151 attached to the trailer chassis, wherein hydraulic actuation of the turntable 151 rotates the platform 101 with respect to the chassis 104 for side loading and rear loading of the trailer. The platform 101 is well suited for loading vehicles and wheeled cargo, whereby a cargo ramp 102 is deployed when swiveled to one side of the chassis. The cargo ramp 102 is stabilized by a pair of outriggers 103 that are hydraulic or locking jack stands at the apex 108 of the ramp. The outriggers 103 prevent tipping of the trailer when vehicles or large cargo are placed on the ramp 102 or the platform 101 when rotated.

Referring specifically to FIG. 2, there is shown a view illustrating the rotation 120 of the cargo platform 101 with respect to the turntable center axis 121. The turntable 151 comprises a bearing assembly that is actuated by hydraulic arms, whereby the trailer or the lead vehicle provides the power to operate the hydraulics and control of their operation can be achieved by way of trailer-mounted controls or controls within the lead vehicle. Along with the outriggers 103 of the cargo ramp 102, additional outriggers (not shown) may be fitted to the trailer to allow for level orientation on otherwise uneven terrain during loading and unloading. Outriggers of such nature are to be well understood by one of ordinary skill in the art of trailers and larger utility vehicles.

Figure 3:
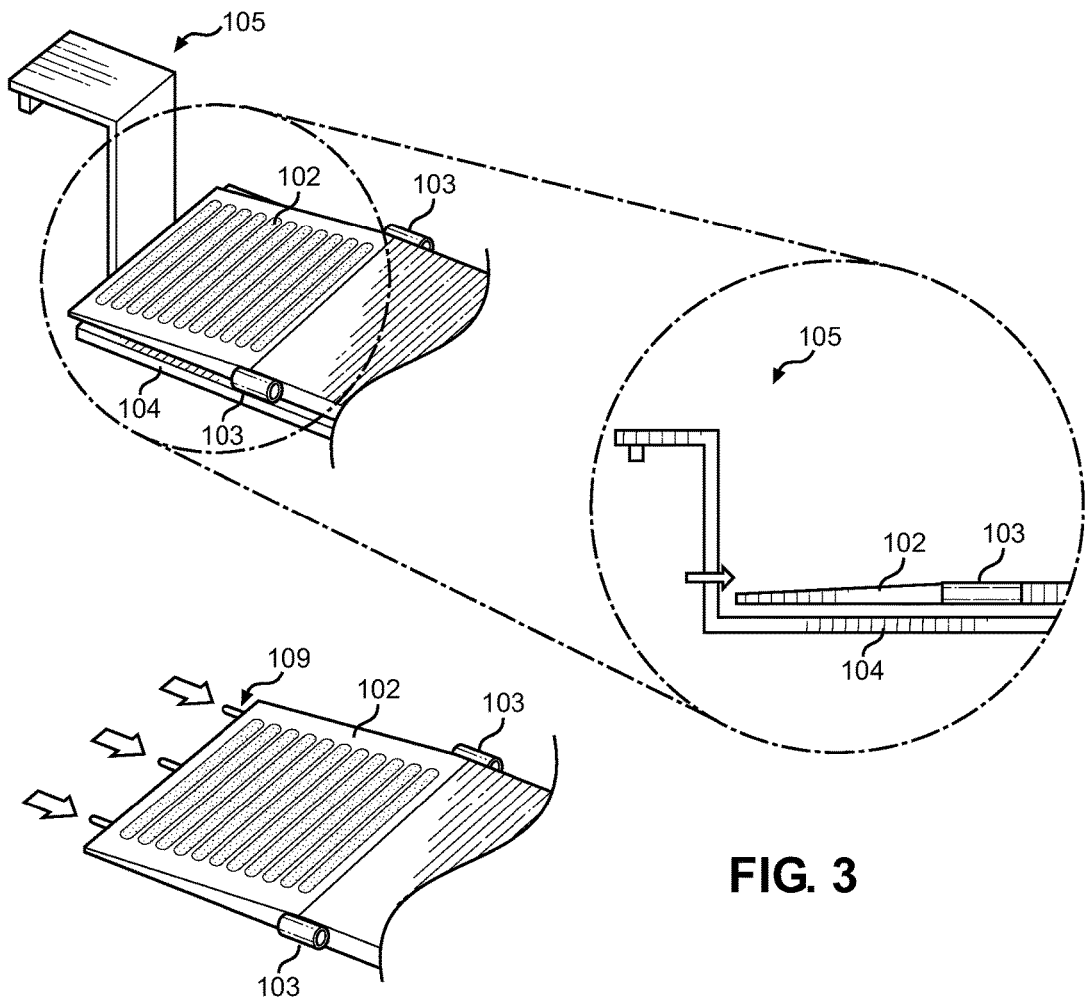
FIG. 3 shows an example of the cargo ramp and the gooseneck towing vehicle connection.

Referring now to FIG. 3, there is shown a view of the trailer vehicle leading end 104, wherein the gooseneck lead vehicle attachment is provided and a view of the cargo ramp 102 is illustrated. The exact configuration of the cargo ramp 102 and the lead vehicle attachment may take on several forms, depending on the load requirements of the trailer and the desired application. As illustrated in FIG. 3, the trailer chassis 104 is supporting the stowed ramp 102 in alignment with the cargo platform. In this orientation, the platform is not being utilized for loading or unloading and the platform can be vacant or supporting cargo thereon.

When the platform is rotated to one side or to the rear, the cargo ramp 102 can be tilted downward to the ground surface. To assist the cargo ramp 102 from sliding, a pair of end extensions 109 may be provided from the end of the ramp 102. These extensions can be inserted into moist surfaces to prevent the end of the cargo ramp 102 from being buried during loading and unloading activities. Similarly, the outriggers 103 may be stowed in alignment with the cargo platform and deployed when required to support the extended platform.

Figure 4:
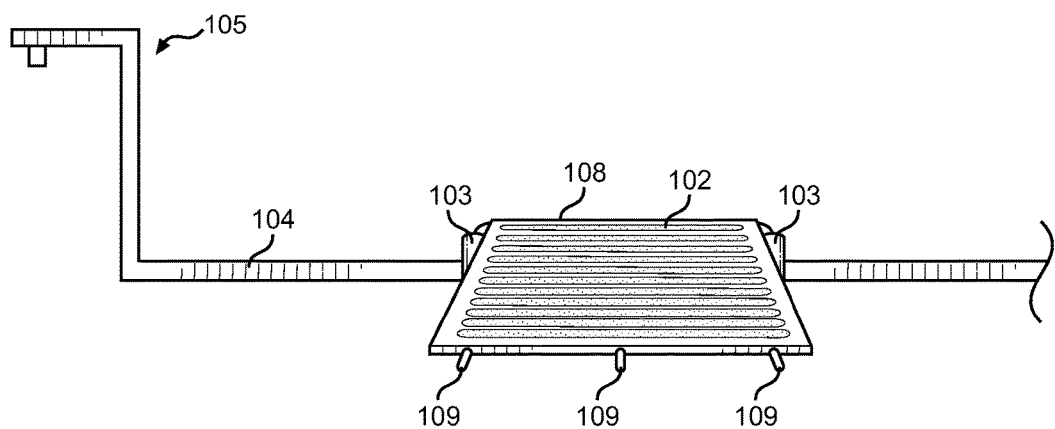
FIG. 4 shows a side view of the trailer vehicle with the cargo platform rotated to one side and the cargo ramp lowered to ground level.

Referring now to FIG. 4, there is shown a side view of the trailer vehicle of the present invention in a loading position. As illustrated, the cargo ramp 102 is deployed and the ramp extensions 105 are extending therefrom. The ramp 102 pivots about a hinge joint at the apex 108 of the cargo ramp and platform, allowing the ramp 102 to descend to ground level for loading and unloading cargo onto the platform. The platform is capable of full and complete rotation about the trailer chassis 104, while the trailer leading end 105 is supported by a lead vehicle or via trailer jacks under the chassis 104 along the leading end 105. To support the platform when extended away from the vehicle chassis 104, the outriggers 103 are deployed for bearing against a ground surface.

Figure 5:
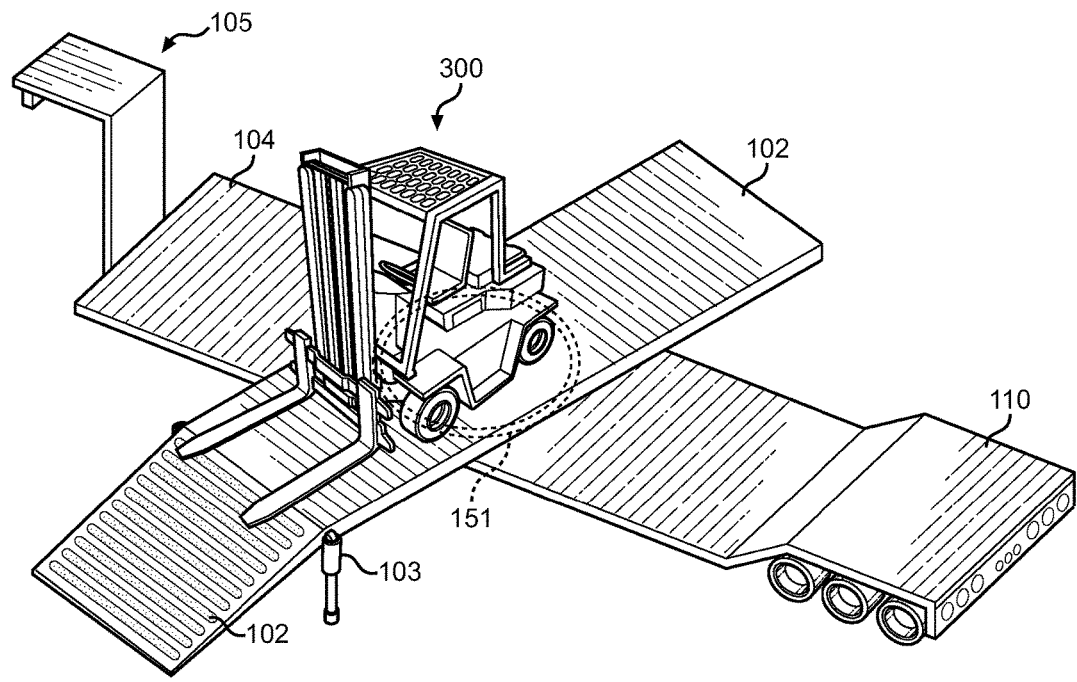
FIG. 5 shows an illustrative view of the trailer vehicle supporting a vehicle thereon and unloading the same from the side of the trailer.

Referring now to FIG. 5, there is shown an illustrative overhead view of the trailer vehicle of the present invention in a working state, unloading a construction vehicle 300 from the platform 101 when in a rotated state. The turntable 151 is capable of rotating the cargo platform 101 when at full capacity or when unloaded, whereby the operator of the trailer can facilitate loading and unloading from the trailer sides if required. In operation, the platform 101 can rotate a complete and continuous rotation, facilitating rear 110 loading or side loading. When rear loading, a rear cargo ramp (not shown) is deployed, or alternatively the cargo ramp 102 of the platform extends beyond the rear extent of the chassis 104 and remains in an elevated position until utilized. When deployed the sides, cargo loads are supported by the out riggers 103, by the cargo platform 101, and by the vehicle chassis 104.

Figure 6:
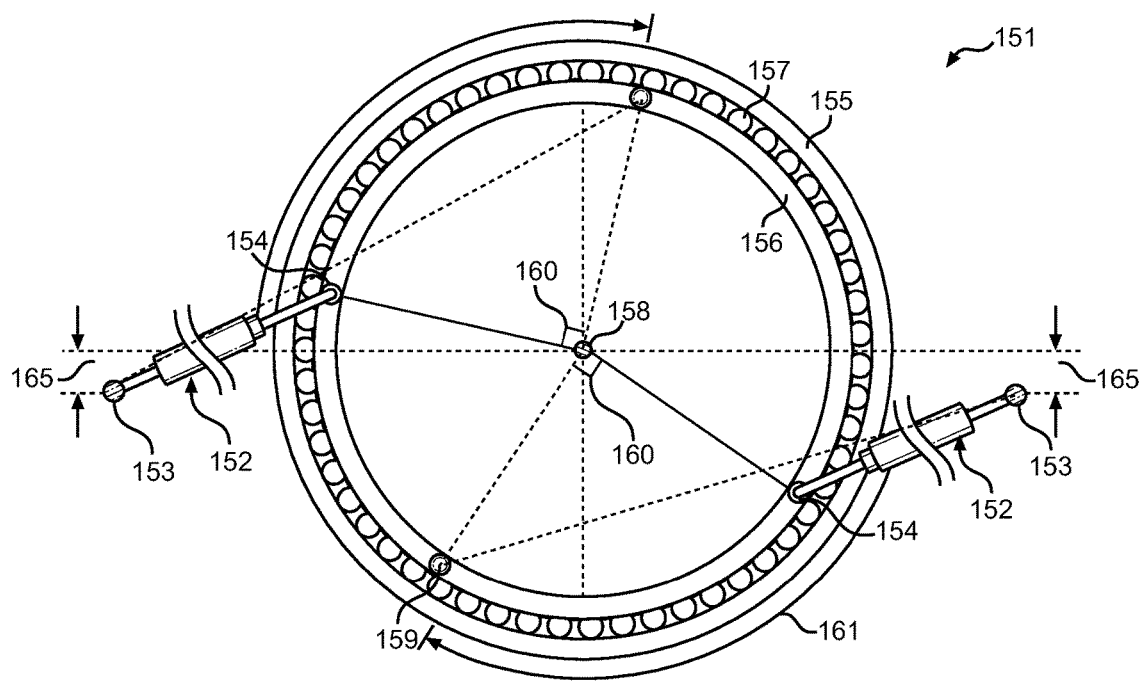
FIG. 6 shows an illustrative embodiment and exemplary configuration of the hydraulically actuated turntable controlling the cargo platform rotation.

Referring now to FIG. 6, there is shown a contemplated embodiment of the hydraulically-actuated turntable 151 that supports the rotatable motion of the cargo platform. The turntable 151 is a rotatable assembly that utilizes a plurality of bearing elements 157, an inner race 156, and an outer race 155 to achieve rotation with minimal mechanical friction. The bearing elements 157 are roller bearings or needle bearings that allow relative rotation between the inner 156 and outer 155 turntable races. To actuate the turntable, at least one hydraulic arm assembly 152 is provided to force one of the turntable races to rotate about the center 158 of the assembly 151.

In a preferred embodiment, the turntable is capable of full rotation about its center axis 158 and continuous rotation thereabout. To achieve this, it is contemplated that a first and second hydraulic arm assembly 152 is disposed about the turntable and offset 165 from the center axis 158 thereof. The offset 165 prevents the hydraulic arms 152 from aligning with each other and aligning with the center point 158 of the turntable 151 at any time during the turntable rotation. This prevents any sticking points or points in which the arms are ineffective at achieving a rotation of the turntable. At least one of the arms 152, therefore, imparts load on the turntable at an offset with respect to the center point 158.

They hydraulic arms 152 comprise fluid-driven piston and cylinder devices that include an attachment point 153 on the trailer chassis and motive input by way of fluid pressure. The hydraulic arms connect 154 to the turntable to impart a motion of either the inner 156 or outer 155 race, where FIG. 6 illustrates a connection 154 with the inner race 156. FIG. 6 further illustrates the motion of the hydraulic arm assemblies 152 during a 90 degree rotation 160, 161, wherein the hydraulic arms 152 are pivotably attached 153 to the trailer chassis and are preferably in different vertical planes from one another to prevent interferences and allow for complete rotation of the turntable 151 if required.

The two arms 152 impart a combination of pulling and pushing loads on the turntable 151 throughout the rotation, wherein the two are never aligned with each other while aligned with the turntable center point 158. In this way, the two hydraulic arms 152 can impart a rotation at all times and not bind. The operation of the push/pull action of each arm is preferably computer controlled and automated with respect to the user, wherein an algorithm controls the amount of pressure in each hydraulic cylinder based on cargo load and degree of rotation of the turntable 151 during operation.

Overall, the present invention discloses a new and novel trailer that facilitates the process of loading and unloading equipment from any angle with respect thereto. The trailer includes a rotational cargo platform that can rotate about the chassis to either side for improving loading efficiency and for reducing requirements on the operators. Traditional trailers for hauling heavy cargo are not rotational in nature to accommodate loading from the sides, making it difficult to load and unload items. Operators generally disconnect the trailer in order to load and unload.

The present invention discloses a trailer having a rotational cargo platform to make the process of loading and unloading equipment easier and more efficient. The trailer includes a lead vehicle attachment means that can be designed to attach the vehicle chassis to various types of semi-truck cabs and lead vehicle trailer components. The device is intended to eliminate the need to disconnect from the trailer to load and unload, and further to eliminate the need for the vehicle operator to maneuver the trailer for loading/unloading efficiency. It is contemplated that vehicle operators and cargo handlers will benefit from the efficiency inherently provided by the present invention.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trailer vehicle, comprising:
   a trailer chassis having a leading end and a trailing end;
   said leading end of said trailer chassis comprising a gooseneck attachment for connecting the trailer chassis to a lead vehicle;
   at least one trailer axle along said trailer chassis length for supporting said trailer chassis;
   a rotatable cargo platform above said trailer chassis adapted to support cargo;
   said rotatable cargo platform having a first end and second end, said second end comprising a rotatable cargo ramp;
   a hydraulically powered turntable rotatably coupling said rotatable cargo platform to said trailer chassis;
   said hydraulically powered turntable having a rotatable inner race, a rotatable outer race, and a plurality of roller bearings positioned therebetween;
   wherein said inner race and said outer race are configured to rotate relative to one another about the plurality of roller bearings;
   a first hydraulic arm assembly and a second hydraulic arm assembly positioned adjacent to the perimeter of said turntable and configured to rotate said turntable about a center axis;
   wherein said first hydraulic arm assembly and said second hydraulic arm assembly each comprise a first end and a second end, wherein said first end is pivotally attached to said trailer chassis and said second end is attached to said turntable.

2. The trailer vehicle of claim 1, wherein said first end of said first hydraulic arm assembly is positioned opposite to said first end of said second hydraulic arm assembly, such that said first ends are aligned in different vertical planes.

3. The trailer vehicle of claim 2, wherein said first end of said first hydraulic arm assembly and said first end of said second hydraulic arm assembly are offset relative to said turntable center axis.

4. The trailer vehicle of claim 1, wherein said second end of said first hydraulic arm assembly and said second end of said second hydraulic arm assembly are attached to said inner race of said turntable, such that said first and second hydraulic arm assemblies are configured to drive said inner race relative to said outer race and rotate said cargo platform relative to said trailer chassis.

5. The trailer vehicle of claim 4, wherein said first and second hydraulic arm assemblies are configured to cooperatively rotate said inner race 360° relative to said outer race.

6. The trailer vehicle of claim 1, further comprising cargo ramp outriggers for supporting said cargo platform second end when said rotatable cargo platform is rotated to a side of said trailer chassis.

7. The trailer vehicle of claim 1, wherein the first end of the first hydraulic arm assembly and the first end of the second hydraulic arm assembly are positioned about an exterior of the hydraulically powered turntable and adjacent to the perimeter of the turntable.

\* \* \* \* \*